United States Patent [19]
Ostrowski

[11] Patent Number: 5,566,345
[45] Date of Patent: Oct. 15, 1996

[54] SCSI BUS CAPACITY EXPANSION CONTROLLER USING GATING CIRCUITS TO ARBITRATE DMA REQUESTS FROM A PLURALITY OF DISK DRIVES

[76] Inventor: Carl L. Ostrowski, 3194 Sunnywood, Ann Arbor, Mich. 48103

[21] Appl. No.: 299,464

[22] Filed: Aug. 31, 1994

[51] Int. Cl.⁶ ..................................................... G06F 13/00
[52] U.S. Cl. ........................... 395/822; 395/856; 395/842; 395/281
[58] Field of Search ..................... 395/822, 281, 395/200.07, 275, 325, 425, 842, 822; 370/85.13, 40.1; 340/825.08

[56] References Cited

U.S. PATENT DOCUMENTS

| | | | |
|---|---|---|---|
| 4,627,052 | 12/1986 | Hoare et al. | 370/85.13 |
| 4,667,193 | 5/1987 | Cotie et al. | 340/825.08 |
| 4,700,342 | 10/1987 | Egami | 370/85.13 |
| 4,737,953 | 4/1988 | Kock et al. | 370/85.13 |
| 4,882,702 | 11/1989 | Struger et al. | 395/822 |
| 4,965,801 | 10/1990 | Dulac | 371/40.1 |
| 5,138,703 | 8/1992 | Igarashi | 395/281 |
| 5,243,700 | 9/1993 | Larsen et al. | 395/822 |
| 5,274,783 | 12/1993 | House et al. | 395/281 |
| 5,280,586 | 1/1994 | Kunz et al. | 395/822 |
| 5,333,277 | 7/1994 | Searls | 395/281 |
| 5,375,218 | 12/1994 | Umeda | 395/842 |
| 5,404,453 | 4/1995 | Lutz et al. | 395/822 |
| 5,437,042 | 7/1995 | Culley et al. | 395/200.07 |

Primary Examiner—Thomas C. Lee
Assistant Examiner—Duo Chen
Attorney, Agent, or Firm—J. Ronald Richebourg; Mark T. Starr; Steven R. Petersen

[57] ABSTRACT

In a data processing system having a data processor coupled to a SCSI channel disposed for transmitting and receiving data between the data processor and a peripheral storage subsystem, a bridge controller for expanding the maximum allowable number of disk drives connectable to the SCSI channel. The bridge controller comprises a microprocessor having input/output terminals coupled to a CPU bus; a memory having input/output terminals coupled to a DMA bus; a buffer coupled between the CPU bus and the DMA bus; a first transceiver coupled between the DMA bus and the SCSI channel; a second transceiver coupled between the DMA bus and the disk drives; and, a circuit for controlling the direction of data flow through the buffer. The circuit has input/output terminals coupled to the CPU bus and a control output coupled to a direction control input terminal of the buffer. The circuit also includes a decoder for decoding the operation requested by the microprocessor and for granting a DMA bus request signal in response thereto; and, an arbitrator that arbitrates between DMA request signals from the microprocessor, the first transceiver or the second transceiver so that a DMA bus grant signal is granted to only one at a time.

12 Claims, 5 Drawing Sheets

SCSI BUS CAPACITY EXPANSION CONTROLLER USING GATING CIRCUITS TO ARBITRATE DMA REQUESTS FROM A PLURALITY OF DISK DRIVES

FIELD OF THE INVENTION

The disclosed invention relates to the field of peripheral devices and more particularly to a circuit adapted for expanding the number of peripheral devices connectable to a SCSI (Small Computer Systems Interface) bus using protocol standards.

BACKGROUND OF THE INVENTION

The widespread and growing acceptance of SCSI is largely a function of the combination of simplicity and the functionality it offers. SCSI is a bus architecture, and as such dictates a set of standard signal protocols. A bus can support up to eight separate addresses. The architecture allows for multiple host connections and peripheral devices to coexist on the same bus. With one host connected to the bus, the remaining seven addresses can be used to attach up to seven peripheral devices.

Most peripheral interfaces support a master/slave relationship, with the host as the master and the peripheral as the slave. This arrangement is satisfactory in the high end of the market where the complex disk subsystems include multiple controllers, multiple ports and multiple paths. However, these sophisticated devices are cost-prohibitive in the entry/medium computer system marketplace. SCSI can provide substantial functionality in this area because of its peer-to-peer design. One of the problems with the conventional prior art arrangement is that the SCSI channel is limited to only seven devices. In many applications it would be helpful to couple many more drives to the same channel.

BRIEF SUMMARY OF THE INVENTION

It is an object of the present invention to provide a connectivity improvement over and above the standard SCSI connectivity.

It is another object of this invention to increase the number of Storage Data Modules for each host adapter from one to seven for an 8-bit host adapter, or to 15 for 16-bit host adapters.

It is yet another object of this invention is to provide a method that will allow four host adapters to address dual ported drives in a single Storage Data Module.

A still further object of this invention is to provide a method that allows a single host adapter to address up to forty-nine 8-bit devices or one hundred and five 16-bit devices.

The present invention is useful in a data processing system having a data processor coupled to a SCSI channel disposed for transmitting and receiving data between the data processor and a peripheral storage subsystem, a bridge controller for expanding the maximum allowable number of disk drives connectable to the SCSI channel. The bridge controller comprises a microprocessor having input/output terminals coupled to a CPU bus; a memory having input/output terminals coupled to a DMA bus; a buffer coupled between the CPU bus and the DMA bus; a first transceiver coupled between the DMA bus and the SCSI channel; a second transceiver coupled between the DMA bus and the disk drives; and, a circuit of the present invention for controlling the direction of data flow through the buffer. The circuit has input/output terminals coupled to the CPU bus and a control output coupled to a direction control input terminal of the buffer. The circuit also includes a decoder for decoding the operation requested by the microprocessor and for granting a DMA bus request signal in response thereto; and, an arbitrator that arbitrates between DMA request signals from the microprocessor, the first transceiver or the second transceiver so that a DMA bus grant signal is granted to only one at a time.

These and other objects, advantages, aspects and features of the present invention will be more fully understood and appreciated upon consideration of the following detailed description of one embodiment, presented in conjunction with the accompanying drawings.

DETAILED DESCRIPTION

Figure 1:
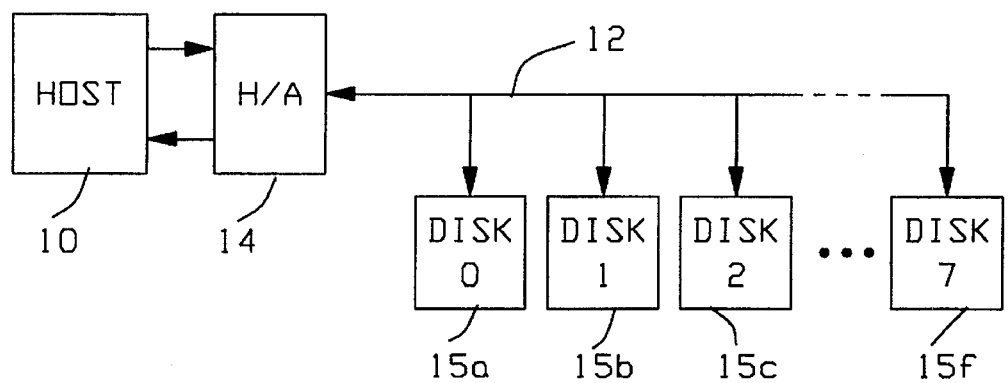
FIG. 1 is a block diagram of a conventional prior art system arrangement of SCSI bus connections for disk drives.

Referring now to the drawings and FIG. 1 in particular, a host computer 10 is coupled to a SCSI bus 12 in a conventional manner by means of a host adapter 14. A plurality of peripheral devices, such as disk drives 15a–15f, are coupled to the same SCSI bus 12. This is the prior art arrangement of coupling disk drives to a host computer using a SCSI channel.

For background purposes, the signals transmitted on the SCSI bus 12 are as follows:

ACK(ACKNOWLEDGE): Driven by the Initiator to acknowledge an Information transfer.

ATN(ATTENTION): Driven by the Initiator when connected to get the Target's attention for sending a MESSAGE OUT.

BSY(BUS BUSY): Indicates that the SCSI Bus is in use. Also, used to gain control of the Bus.

C/D(COMMAND OR DATA): Driven by the Target to indicate the Bus Phase. In general, it indicates whether data or "other information" is being transferred.

DB(7–0) (DATA BUS): Driven by either device, as determined by the state of the I/O signal. Contains the data that is sent from one device to the other during an Information Transfer.

DB(P) (DATA BUS PARITY): Driven by either device. Contains the parity bit for the data that is sent on DB(0–7) from one device to the other during Information Transfer.

I/O (INPUT OR OUTPUT): Driven by the Target to indicate the Bus Phase. In general, I/O indicates the bus information transfer direction. I/O also determines the SELECTION and RESELECTION phases. "True/Asserted" indicates the direction from the Target to the Initiator.

MSG (MESSAGE PHASE): Driven by the Target to indicate the Bus Phase. In general, indicates whether the "other" information alluded to under C/D is a MESSAGE IN, MESSAGE OUT, COMMAND, or STATUS information.

REQ (REQUEST): Driven by the Target to request an Information Transfer.

RST (BUS RESET): Driven by any device to clear all devices from the bus. May cause "power on reset" type condition on many devices.

SEL (SELECT DEVICE): Driven by: (1) an Initiator to select a Target; or, (2) a Target to reselect an Initiator.

Figure 2:
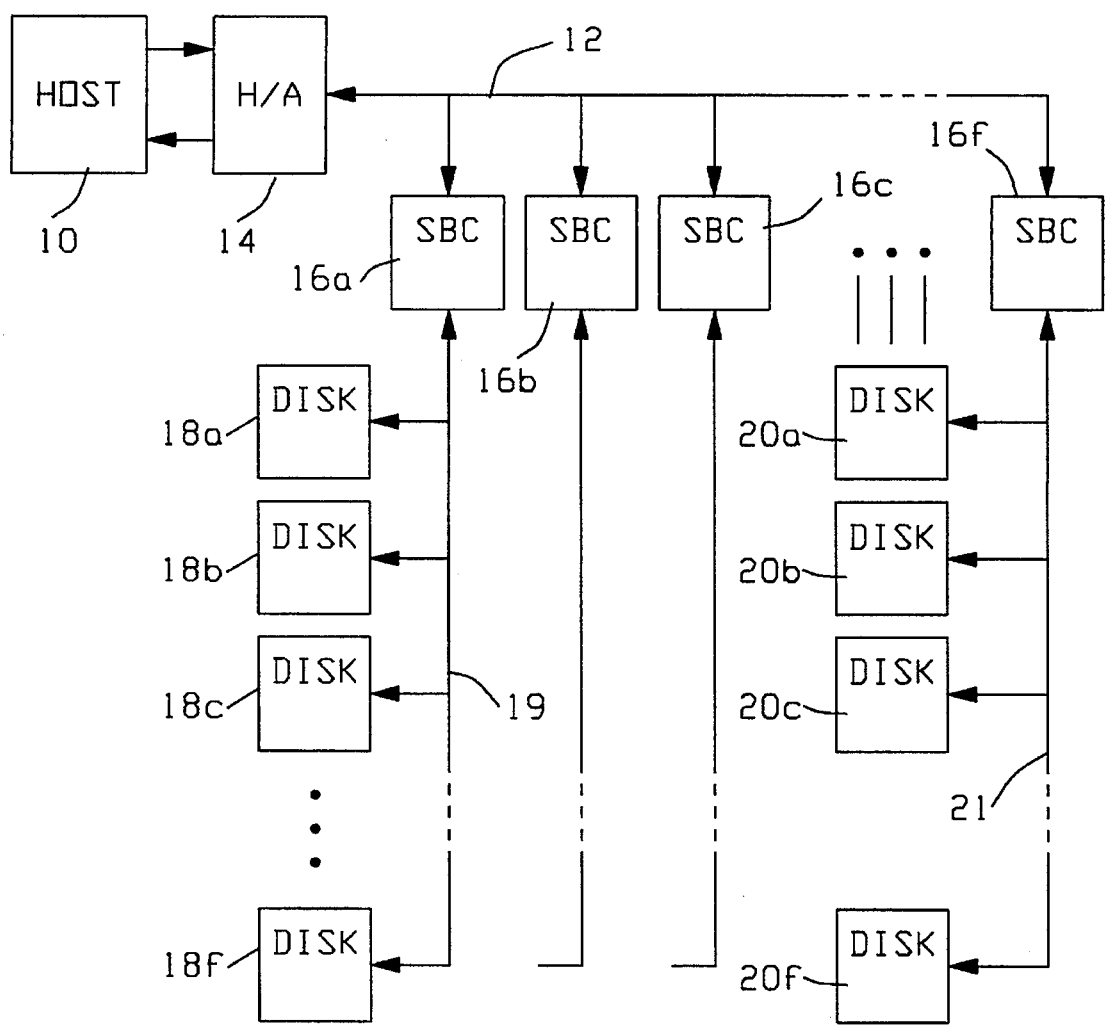
FIG. 2 is a block diagram of an expanded array of disk drives employing the circuit of the present invention.

Referring now to FIG. 2, a system is shown which has been expanded by use of the SCSI Bridge Controller ("SBC") of the present invention. In particular, one or more circuits 16a–16f are connected to the individual peripheral device slots; and, each of these circuits has the capability of coupling up to seven individual disk drives by using the controller of this invention. Thus, it is possible to increase the number of disk drives connected to a single SCSI channel by seven. That is, disk drives 18a–18f are coupled to circuit 16a by means of channel 19, and disk drives 20a–20f are coupled to circuit 16f by means of channel 21 with similar connections of disk drives to circuits 16b–16e.

Figure 3:
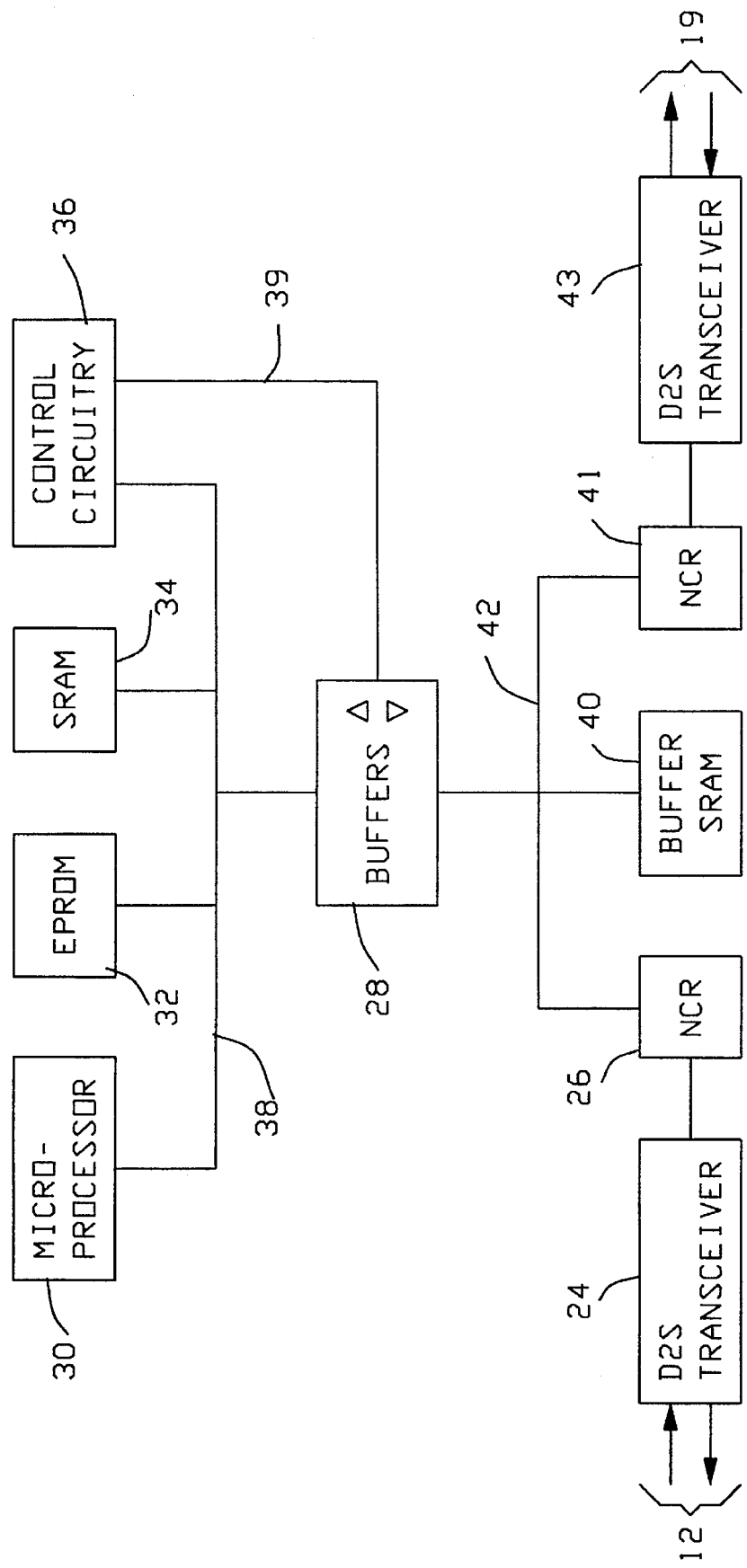
FIG. 3 is a block diagram of the SCSI Bridge Controller of the present invention.

Referring now to FIG. 3, a block diagram of the circuit 16a is shown. Lines 12 from the host adapter 14 are coupled to input terminals of a transceiver 24, which converts the differential signal on the SCSI channel to a single-ended format. Details of such a transceiver are disclosed in U.S. Pat. No. 5,379,405, entitled A SCSI CONVERTER WITH SIMPLE LOGIC CIRCUIT ARBITRATION FOR PROVIDING BILATERAL CONVERSION BETWEEN SINGLE ENDED SIGNALS AND DIFFERENTIAL SIGNALS, by Carl Ostrowski and assigned to the same assignee as this application. The single-ended output of the transceiver 24 is coupled to an input of a 53C720 SCSI Controller Chip 26, available from NCR Corporation, Dayton, Ohio and the output thereof is coupled to a bilateral buffer 28. The other side of the buffer is coupled to a microprocessor 30, which could be any commercially available microprocessor, however in the disclosed embodiment a 386sx-20 Microprocessor is used. This microprocessor is available from a number of suppliers including Intel Corporation of Santa Clara, Calif. Moreover, the structure and operation of microcontrollers, similar to that use herein, is explained in greater detail in a book entitled "Microcontrollers: Architecture, Implementation, and Programing" by Kenneth Hintz and Daniel Tabak and published by McGraw-Hill, Inc. of New York, N.Y.

The outputs of the buffers 28 are also coupled to data/address lines of an Electrically Erasable PROM 32, a static SRAM 34 and a control circuit 36 by means of a CPU bus 38, which in one embodiment is 16 data bits wide. The control circuit is also coupled to a directional control input of the buffers 28 by means of a line 39. The other side of the buffers 28 is coupled to data/address lines of a buffer SRAM 40 and the SCSI Controller chip 26 as well as another SCSI Controller Chip 41 by means of a DMA data bus 42. The SCSI Controller Chip 41 is coupled to another transceiver 43, which is coupled to the channel 19.

The control circuit 36 is shown in greater detail in FIG. 4 and described in greater detail hereinafter. The bus 38 is independent of the bus 42 and the CPU can access the bus 42 by control signals from the control circuit 36 via the line 39, which change the direction of data flow through the buffers 28. The NCR chips 26 and 41 have their own processors with separate 32-bit wide DMA channels and compete with the microprocessor (sometimes referred to herein as the "CPU") 30 for access to the bus 42. The CPU 30 can operate independently of data flowing into or out of the SRAM 40 via the NCR chips 26 or 41.

In a typical operation, assume that the transceiver 24 is connected to the host via the lines 12, and the transceiver 43 is connected to the drive via the lines 19. Assume further that data is to be transferred from the host to the drive for storage therein. The NCR chip 26 generates a signal to notify the CPU that data is arriving for storage in the SRAM 40. The CPU instructs the NCR chip 26 to receive the data and transfer it into the SRAM 40 via its 32-bit wide DMA channel (in a manner similar to a disk writing onto media). Data is transferred in bursts of eight double words at a time. The CPU may access the bus 42 between any of the bursts of data. Next, the CPU instructs the NCR chip 41 to remove the data from the SRAM 40 and transmit it through the transceiver 43 onto the lines 19. The NCR chips 26 and 41 time multiplex access to the DMA bus 42. Also, the CPU 30 can be time multiplexed into the bus 42 to examine the chips 26 or 41 of the SRAM 40 for status information, etc.

Figure 4:
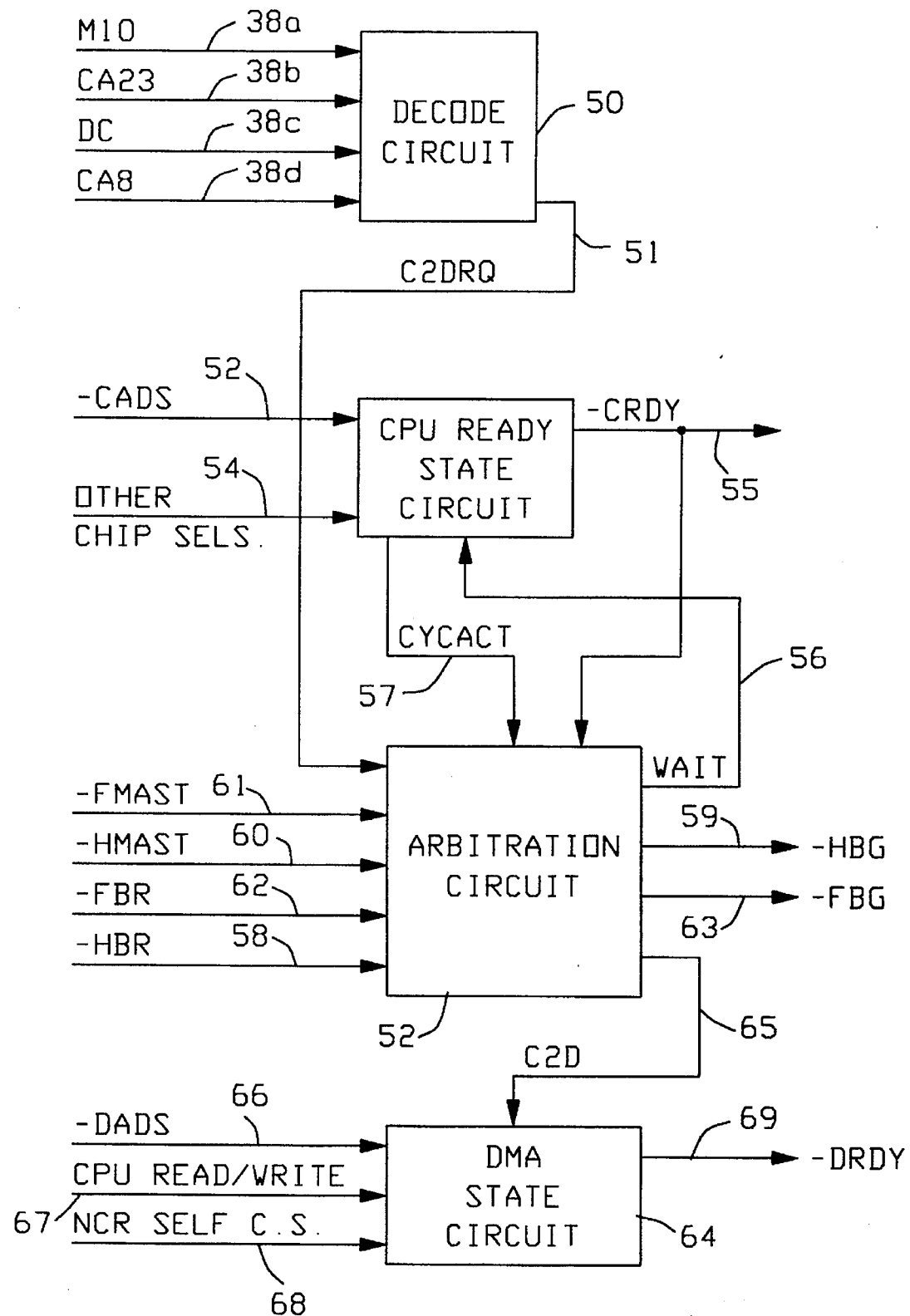
FIG. 4 is a block diagram of the control circuit of the diagram shown in FIG. 3.

Referring now to FIG. 4, a block diagram of the control circuitry 36 is shown. Control signals from the microprocessor 30 are supplied on lines 38a, 38b, 38c and 38d to a decode circuit 50. As will be amplified hereinafter, the circuit 50 generates a signal requesting that the CPU be given access to the DMA bus 42, which signal is referred to herein as "C2DRQ" and is supplied on a line 51 to an arbitration circuit 52. The circuit 50 decodes various signals so as to generate the C2DRQ signal. For example, if an I/O address operation requires access to either of the NCR chips 26 or 41, the circuit 50 decodes the appropriate signals and generates the C2DRQ signal. Moreover, if access is required to the SRAM 40 the circuit 50 decodes the signals and again generates the C2DRQ signal.

The microprocessor 30 generates an address/data signal, referred to herein as "CADS", each time it wishes to perform an operation and this signal is supplied on a line 38e to a CPU Ready State Circuit 53. Other signals entitled Other Chip Selects, which is indicative of whether any other chip on the CPU bus 38 is selected, is supplied on a line 54 to the Circuit 53. A signal (entitled "CRDY") indicative of the CPU completing its bus cycle is provided at an output of the Circuit 53 on a line 55. The Arbitration Circuit acts as a "traffic cop" among the various circuits of this apparatus, and generates a "WAIT" signal when a request cannot be serviced. The WAIT signal is supplied on a line 56 from the Circuit 52, and is applied to an input terminal of the Circuit 53. A signal indicating that the CPU is active is supplied on a line 57 from the Circuit 53 to the Circuit 52, which signal is denoted herein as "CYCACT".

At this juncture of the description it should be pointed out that a convention will be employed denoting the host side of the apparatus by the letter "H" and the drive side by the letter "F". Assume that data is being transmitted from the host to the drive. Then, data would appear at the transceiver 24 on the bus 12 and a bus request signal -HBR would be applied to the Circuit 52 on a line 58. If conditions are met, i.e. the bus is not busy with another service, then the bus request will be granted to the host. This grant signal is referred to herein as HBG, and is supplied on a line 59 from the Circuit 52. Once the bus is granted to the host, the host NCR (e.g. 26) will respond with a signal referred to herein as host master or HMAST on a line 60. Likewise, if the grant is to the drive NCR then it will respond with an FMAST signal on a line 61.

A drive side request for the bus is denoted by signal FBR, which is supplied on a line 62 to the Circuit 52. The grant to the drive side request is denoted FBG and is supplied on a line 63 from the Circuit 52.

When a transfer of data is to take place from the CPU bus 38 to the DMA bus 42, a request signal (denoted "C2DRQ") is supplied from the Circuit 51 to the Arbitration Circuit on a line 51. The Arbitration Circuit determines if and when the bus 42 can be granted to the CPU and sends a grant signal (denoted "C2D") to a DMA State Circuit 64 on a line 65.

The NCR chips 26 and 41 generate an address/data signal valid, referred to herein as "DADS", each time they wish to perform an operation, and this signal is supplied to the Circuit 64 on a line 66. Additional signals "CPU READ/WRITE" and "NCR SELF C.S." (i.e., Chip Select) are supplied on lines 67 and 68 to the Circuit 64, which signals will be amplified hereinafter. The Circuit 64 provides a signal on a line 69 indicating that the DMA bus 42 is ready for the next cycle, which signal is denoted herein as DRDY.

Generally, the control circuitry 36 functions to control the transfer of data to and from the microprocessor 30 (i.e. CPU) as well to and from the Buffer SRAM 40. This function also controls the transfer of data to or from either of the buses 12 or 19. For example, in one embodiment the control circuitry 36 allows a burst of eight two-word bytes of data from the bus 12 to the SRAM 40 or from the bus 19 to the SRAM 40. If a bus request (C2DRQ signal) occurs during such transfers of data, the WAIT signal postpones such request until the end of the eight-byte burst of data. These control functions will become clearer following a description of the details of the Circuits 50, 52, 53 and 62 taken in conjunction with FIGS. 5–8.

Figure 5:
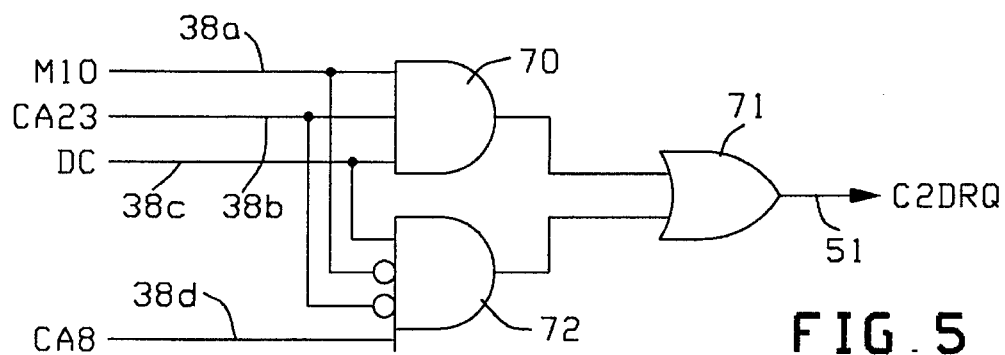
FIG. 5 is a schematic diagram of the Decode Circuit.

The details of the Decode Circuit 50 are shown in the schematic diagram of FIG. 5. The I/O operation signals supplied on the lines 38a, 38b and 38c are applied to the three inputs of an AND gate 70 and the output thereof is supplied to one of two inputs of an OR gate 71. The signals supplied on lines 38a and 38b are coupled to two inverting input terminals of an AND gate 72, respectively. The signal supplied on line 38c is supplied to a third input of the AND gate 72 and the signal supplied on the line 38d is supplied to a fourth input of the AND gate 72. The output of the AND gate 72 is coupled to a second input of the OR gate 71, and the output of the OR gate 71 provides the C2DRQ signal on the line 51.

Figure 6:
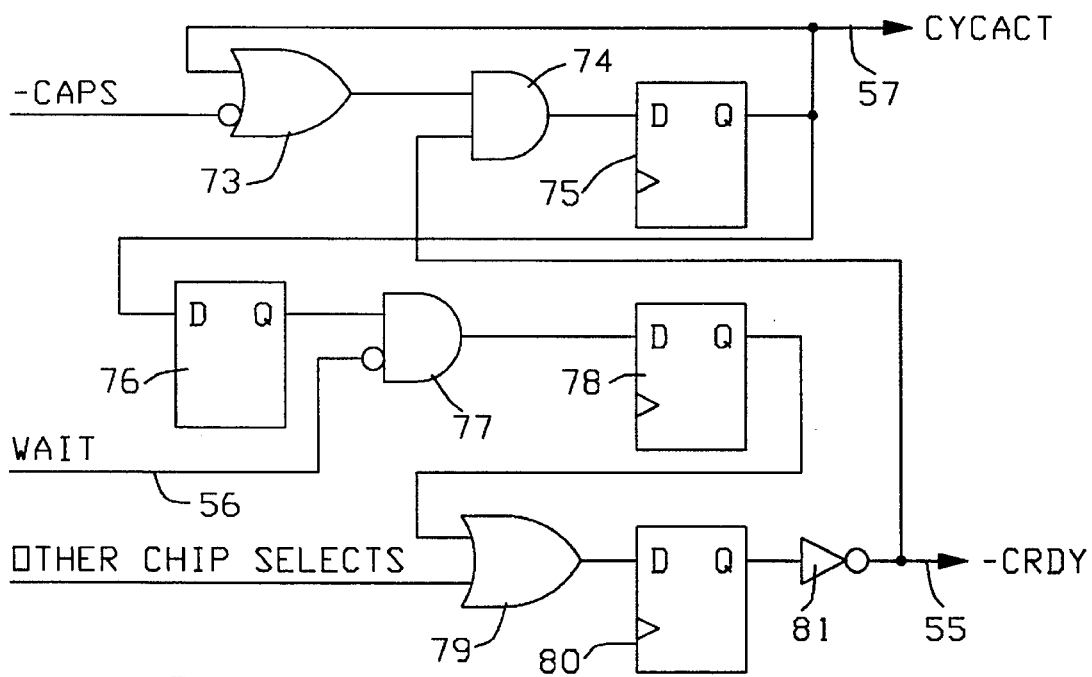
FIG. 6 is a schematic diagram of the CPU Ready State Circuit.

Referring now to FIG. 6, details of the CPU Ready State Circuit 53 are shown. The CADS signal line 52 is coupled to an inverting input terminal of an OR gate 73, and the output thereof is coupled to one of two input terminals of an AND gate 74. The CADS signal, which in this embodiment is pulsed active low, represents that the CPU wants to do something. Once the CPU receives the CRDY signal the requested operation has been completed.

The output of the AND gate 74 is coupled to the D data input terminal of a flip-flop 75 and the Q true output thereof is coupled to the second input of the OR gate 73, to the line 57 which conveys the CPU active (CYCACT) signal, and to the D data input terminal of another flip-flop 76.

The Q true output of the flip-flop 76 is coupled to one of two inputs of an AND gate 77 and the output thereof is coupled to the D data input of yet another flip-flop 78. The WAIT signal line 56 is coupled to an inverting input terminal of the AND gate 77. The Q true output of the flip-flop 78 is coupled to one of two inputs of an OR gate 79 and the output thereof is coupled to the D data input of a flip-flop 80. The chip select signal supplied on the line 54 is coupled to the second input of the OR gate 79. The Q true output of the flip-flop 80 is coupled through an inverter 81 to the line 55 transmitting the CRDY signal. Also, the line 55 is coupled back to the second input of the AND gate 74.

For example, if the CPU desires access to the SRAM 40 the first thing that occurs is the CADS signal is pulsed active low. This sets a latch formed by the gates 73 and 74 and the flip-flop 75. The CPU active signal CYCACT goes high and stays high until this latch is reset. When the CRDY signal goes low the latch is reset. The CYCACT signal is passed through the flip-flops 76, 78 and 80 and through the inverter 81 to produce the CRDY signal if the WAIT signal is low. Also, if other chips of the controller have been selected, and the line 54 is high then the flip-flop 80 will be set and CRDY is pulsed low on the line 55. The CRDY signal being pulsed low informs the CPU that it can perform other operations at this time.

Figure 7:
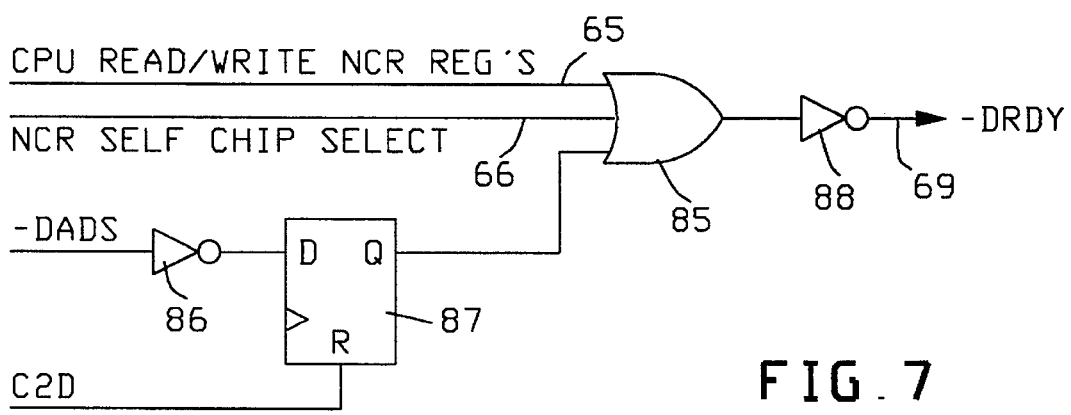
FIG. 7 is a schematic diagram of the DMA State Circuit.

Details of the DMA State Circuit 62 are shown in FIG. 7, wherein the lines 67 and 68 are coupled to two of three inputs of an OR gate 85. The signals supplied on lines 67 and 68 are for special cases which will supply differently timed ready signal to the NCR chips of the DMA bus 42. The DMA bus address signal, DADS, supplied on the line 64 is coupled through an inverter 86 to the D data input terminal of a flip-flop 87. The line 65, which conveys the C2D signal, is coupled to the Reset terminal of the flip-flop 87. The Q true output of the flip-flop 87 is coupled to the third input of the OR gate 85 and the output of this OR gate is coupled through an inverter 88 to the line 69 transmitting the DMA bus ready DRDY, signal. I n operation, when the DADS signal is pulsed active low which means the beginning of a DMA operation, the DRDY signal pulsed active low on the line 69. When this occurs the NCR chip is freed up to perform any other operation. This sequence of operations continues until the NCR chip is out of data to be transferred.

Figure 8:
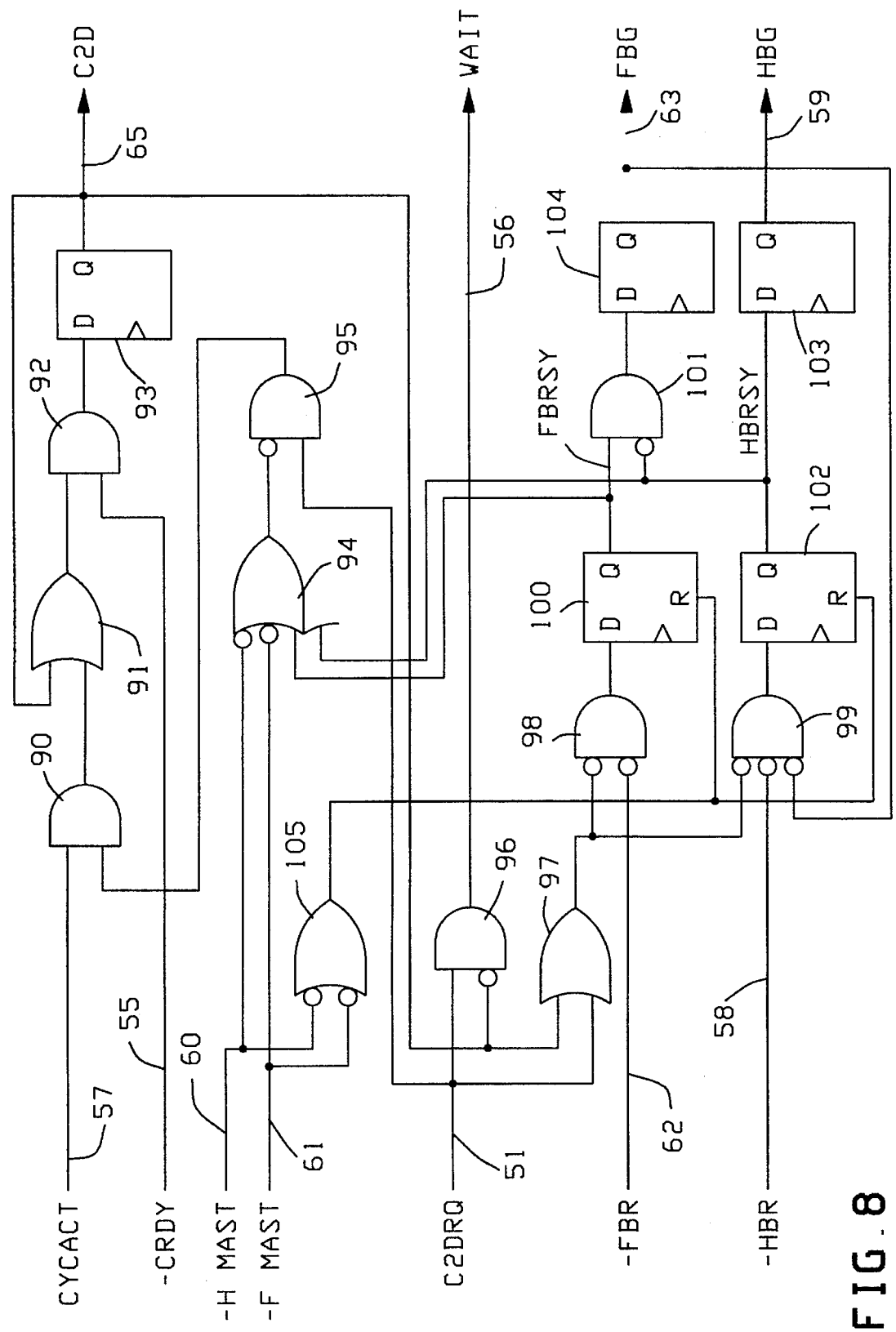
FIG. 8 is a schematic diagram of the Arbitration Circuit.

Referring now to FIG. 8, details of the Arbitration Circuit 52 are shown. The CPU active, "CYCACT", signal on line 57 is supplied to one of two inputs of an AND gate 90, and the output thereof is coupled to one of two inputs of an OR gate 91. The output of the OR gate 91 is coupled to one of two inputs of an AND gate 92, and the output thereof is coupled to the D data input of a flip-flop 93. The Q true output of the flip-flop 93 is coupled to the line 63, which transmits the CPU to DMA signal "C2D". The line 63 is coupled back to the second input of the OR gate 91 thereby forming a latch circuit.

The host and drive master signals, HMAST and FMAST respectively, are supplied on the lines 60 and 61 to two inverting inputs of an OR gate 94 and the output thereof is coupled to an inverting input of an AND gate 95. The output of the AND gate 95 is coupled back to the second input of the AND gate 90.

The line 51 transmitting the CPU to DMA bus request signal, "C2DRQ", is coupled to one of two inputs of an AND gate 96 and the output thereof is coupled to the line 56 transmitting the WAIT signal. The line 51 is also coupled to the second input of the AND gate 95, and to one of two inputs of an OR gate 97. The output of the OR gate 97 is coupled to inverting input terminals of AND gates 98 and 99. The line 60 transmitting the drive bus request signal, FBR, is coupled to a second inverting input of the AND gate 98. The output of the AND gate 98 is coupled to the D data input of a flip-flop 100. The Q true output of the flip-flop 100 is coupled to one of two inputs of an AND gate 101 and to a third input of the OR gate 94.

The line 58 transmitting the host bus request signal, HBR, is coupled to an inverting input of the AND gate 99, and the output thereof is coupled to the D data input of a flip-flop 102. The Q true output of the flip-flop 102 is coupled to the D data input of another flip-flop 103, and to the fourth input of the OR gate 94. The output of the flip-flop 100 is referred to herein as the drive bus request sync signal, FBRSY; and, the output of the flip-flop 102 is referred to herein as the host bus request sync signal, HBRSY. The output of the AND gate 101 is coupled to the D data input of yet another flip-flop 104, and the Q true output thereof is coupled to the line 61 transmitting the drive bus grant signal, FBG. Also, the line 61 is coupled back to a third inverting input of the AND gate 99 to inhibit a host bus grant while the drive has been granted the bus. The Q true output of the flip-flop 103 is coupled to the line 59 transmitting the host bus grant, HBG.

The host and drive master signals, HMAST and FMAST supplied on the lines 60 and 61 are also coupled to two inverting inputs of an OR gate 105 and the output thereof is coupled to the RESET input terminals of the flip-flops 100 and 102.

The C2D signal when high indicates that the CPU 30 has been granted the bus 42. Thus, via the OR gate 97 the AND gates 98 and 99 are disabled. This means that the flip-flops 100 and 101 cannot be set, which means that neither the host nor the drive can be granted the bus, i.e., neither FBG or HBG can go high. If C2D is low, i.e., the CPU does not have the bus, and the bus request signal C2DRQ goes high, the AND gate 96 is enabled, which means that the WAIT signal goes high if the CPU 30 is requesting the DMA bus 42, thereby making the CPU 30 wait. The CPU 30 will wait until the bus is available. The FMAST and the HMAST signals determine when the bus is available.

If either FMAST or HMAST is active low, the output of the OR gate 94 goes high and the AND gate 95 is disabled. This means that the AND gate 90 is disabled and the flip-flop will not go high. If either of the signals at the output of the flip-flops 100 and 102, FBRSY of HBRSY respectively, the same result will be reached through the OR gate 94. These signals are sync signals and hold a grant to the CPU 30 while FBG or HBG is going high (i.e. granting the bus to the host or the drive). The reason for this is that in the process of granting the bus to the host or to a drive it is undesirable to let the CPU 30 jump in and grab the bus away from them.

When arbitrating between two NCR chips, the worse case occurs when both request happens at the same time. I.e., both flip-flops 100 and 102 are set at the same time. The sync signals FBRSY and HBRSY are both high and C2D is inhibited by gates 94 and 95. However, the output of the flip-flop 102 is coupled to an inverting input of the AND gate 101, which inhibits setting the flip-flop 104. Hence, in this case HBG goes high and FBG stays low. The master signal HMAST goes low because the host NCR chip 26 claims the bus grant. As a result, the output of the OR gate 105 goes high, which resets the flip-flops 100 and 102. When the host NCR chip has finished the task for which the bus was granted, the HMAST signal goes high again.

If the FBR signal beats the HBR signal, the FBG will go high, and because of the loop back to the AND gate 99 any subsequent HBR signals will be inhibited from interfering from the grant to the drive side.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a data processing system having a data processor coupled to a SCSI channel disposed for transmitting and receiving data between said data processor and a peripheral storage subsystem, said subsystem including a bridge controller for expanding the maximum allowable number of disk drives connectable to said SCSI channel, said bridge controller comprising:

a. a microprocessor having input/output terminals coupled to a CPU bus;

b. a memory having input/output terminals coupled to a DMA bus;

c. a buffer coupled between said CPU bus and said DMA bus;

d. first transceiver coupled between said DMA bus and said SCSI channel and producing a DMA bus request signal, HBR, in response to receiving data from said SCSI channel, and producing a grant signal, HBG, indicative of being granted control of said DMA bus;

e. second transceiver coupled between said DMA bus and said disk drives and producing a DMA bus request signal, FBR, in response to receiving data from at least one of said disk drives, and producing a grant signal, FBG, indicative of being granted control of said DMA bus; and, f. a control circuit for directing data flow through said buffer, said control circuit having input/output terminals coupled to said CPU bus and a control output coupled to a direction input terminal of said buffer, wherein said control circuit includes:

i. a decoder for decoding operation signals from said microprocessor and for generating a DMA bus request signal, C2DRQ, in response to said decoding operation signals, said decoder including:

1) a first AND gating circuit having inputs coupled to outputs of said microprocessor indicative of an input/output address operation;

2) a second AND gating circuit having inputs coupled to other outputs of said microprocessor indicative of a memory address operation; and, 3) an OR gating circuit having inputs coupled to outputs of said first and said second AND gating circuits and an output supplying a signal that requests access for said microprocessor to said DMA bus; and, ii. an arbitrator for arbitrating between said DMA request signals, HBR, FBR and C2DRQ signals and for granting a DMA bus grant signal, HBG, FBG or C2D, respectively, to only one request at a time.

2. A controller in accordance with claim 1 wherein said arbitrator further includes:

1) a first gating circuit responsive to said DMA bus request signal at the output of said OR gating circuit having a first OR gate with inputs disposed for receiving said signals indicative of having control of said DMA bus, an output coupled to a first input of a first AND gate and a first flip-flop having a data input coupled to an output of said first AND gate;

2) a second gating circuit responsive to a DMA bus request signal from said first transceiver having a second AND gate with a first inverting input terminal disposed for receiving said DMA bus request signal from said microprocessor and a second inverting input terminal disposed for receiving said DMA bus request signal from said first transceiver and a second flip-flop circuit with a data input terminal coupled to an output of said second AND gate, the output of second said flip-flop disposed for providing a bus grant signal for said first transceiver; and, 3) a third gating circuit responsive to a DMA bus request signal from said second transceiver having a third AND gate with a first inverting input terminal disposed for receiving said DMA bus request signal from said microprocessor and a second input terminal disposed for receiving said DMA bus request signal from said second transceiver and a third flip-flop with a data input terminal coupled to an output of said third AND gate, the output of said third flip-flop disposed for providing a bus grant signal for said second transceiver.

3. A controller in accordance with claim 2 wherein said first gating circuit further includes a second OR gate having a pair of input terminals disposed for receiving a host master signal, HMAST, and a drive master signal, FMAST, indicative of said first transceiver and said second transceiver, respectively, having control of said DMA bus, and having an output terminal coupled to reset terminals of said second and said third flip-flops.

4. A controller in accordance with claim 2 wherein said first gating circuit includes an OR gate responsive to said C2DRQ signal from said microprocessor and said C2D bus grant signal for said microprocessor for inhibiting said second and said third flip-flops.

5. A controller in accordance with claim 2 wherein said second gating circuit includes a third inverting input of said second AND gate so as to inhibit activation of said HBG signal if said FBG signal is active indicating that said DMA bus has been granted to said first transceiver.

6. A controller in accordance with claim 2 wherein said third gating circuit includes fourth AND gate having a first input coupled to output of said first flip-flop and having an inverting input terminal disposed for receiving output of said second transceiver if said DMA bus has been granted to said first transceiver.

7. A controller in accordance with claim 5 wherein said second gating circuit also includes a fourth flip-flop having a data input coupled to the output of said second flip-flop.

8. In a data processing system having a data processor coupled to a SCSI channel disposed for transmitting and receiving data between said data processor and a peripheral storage subsystem, said subsystem including a bridge controller for expanding the maximum allowable number of disk drives connectable to said SCSI channel, said bridge controller comprising:

a. a microprocessor having input/output terminals coupled to a CPU bus;

b. a memory having input/output terminals coupled to a DMA bus;

c. a buffer coupled between said CPU bus and said DMA bus;

d. first transceiver coupled between said DMA bus and said SCSI channel and producing a DMA bus request signal, HBR, in response to receiving data from said SCSI channel, and producing a grant signal, HBG, indicative of being granted control of said DMA bus;

e. second transceiver coupled between said DMA bus and said disk drives and producing a DMA bus request signal, FBR, in response to receiving data from at least one of said disk drives, and producing a grant signal, FBG, indicative of being granted control of said DMA bus;

f. a control circuit for directing data flow through said buffer, said control circuit having input/output terminals coupled to said CPU bus and a control output coupled to a direction input terminal of said buffer, wherein said control circuit includes:

i. a decoder for decoding operation signals from said microprocessor and for generating a DMA bus request signal, C2DRQ, in response to said decoding operation signals, and, ii. an arbitrator for arbitrating between said DMA request signals, HBR, FBR and C2DRQ signals and for granting a DMA bus grant signal, HBG, FBG or C2D, respectively, to only one request at a time, said arbitrator including:

1) a first gating circuit responsive to said DMA bus request signal at the output of said OR gating circuit having a first OR gate with inputs disposed for receiving said signals indicative of having control of said DMA bus, an output coupled to a first input of a first AND gate and a first flip-flop having a data input coupled to an output of said first AND gate;

2) a second gating circuit responsive to a DMA bus request signal from said first transceiver having a second AND gate with a first inverting input terminal disposed for receiving said DMA bus request signal from said microprocessor and a second inverting input terminal disposed for receiving said DMA bus request signal from said first transceiver and a second flip-flop circuit with a data input terminal coupled to an output of said second AND gate, the output of second said flip-flop disposed for providing a bus grant signal for said first transceiver; and, 3) a third gating circuit responsive to a DMA bus request signal from said second transceiver having a third AND gate with a first inverting input terminal disposed for receiving said DMA bus request signal from said microprocessor and a second input terminal disposed for receiving said DMA bus request signal from said second transceiver and a third flip-flop with a data input terminal coupled to an output of said third AND gate, the output of said third flip-flop disposed for providing a bus grant signal for said second transceiver.

9. A controller in accordance with claim 8 wherein said first gating circuit further includes a second OR gate having a pair of input terminals disposed for receiving a host master signal, HMAST, and a drive master signal, FMAST, indicative of said first transceiver and said second transceiver, respectively, having control of said DMA bus, and having an output terminal coupled to reset terminals of said second and said third flip-flops.

10. A controller in accordance with claim 8 wherein said first gating circuit includes an OR gate responsive to said C2DRQ signal from said microprocessor and said C2D bus grant signal for said microprocessor for inhibiting said second and said third flip-flops.

11. A controller in accordance with claim 8 wherein said second gating circuit includes a third inverting input of said second AND gate so as to inhibit activation of said HBG signal if said FBG signal is active indicating that said DMA bus has been granted to said first transceiver.

12. A controller in accordance with claim 8 wherein said third gating circuit includes a fourth AND gate having a first input coupled to output of said first flip-flop and having an inverting input terminal disposed for receiving output of said second transceiver if said DMA bus has been granted to said first transceiver.

* * * * *